(12) United States Patent
Abusleme et al.

(10) Patent No.: US 10,256,498 B2
(45) Date of Patent: Apr. 9, 2019

(54) PROCESS FOR MANUFACTURING BATTERY COMPONENTS

(75) Inventors: Julio A. Abusleme, Saronno (IT); Riccardo Pieri, Milan (IT); Paolo Fossati, Mariano (IT)

(73) Assignee: SOLVAY SPECIALTY POLYMERS ITALY S.P.A., Bollate (MI) (IT)

(*) Notice: Subject to any disclaimer, the term of this patent is extended or adjusted under 35 U.S.C. 154(b) by 0 days.

(21) Appl. No.: 14/127,379

(22) PCT Filed: Jun. 15, 2012

(86) PCT No.: PCT/EP2012/061424
§ 371 (c)(1),
(2), (4) Date: Dec. 18, 2013

(87) PCT Pub. No.: WO2012/175418
PCT Pub. Date: Dec. 27, 2012

(65) Prior Publication Data
US 2014/0120269 A1    May 1, 2014

(30) Foreign Application Priority Data

Jun. 23, 2011  (EP) .................................. 11171201

(51) Int. Cl.
| H01M 2/14 | (2006.01) |
|---|---|
| H01M 10/04 | (2006.01) |
| H01M 2/16 | (2006.01) |
| C08K 5/107 | (2006.01) |
| C08K 5/151 | (2006.01) |
| B05D 3/00 | (2006.01) |
| C23C 6/00 | (2006.01) |
| C23C 18/18 | (2006.01) |
| B05D 1/26 | (2006.01) |
| B05D 3/02 | (2006.01) |
| C23C 18/04 | (2006.01) |
| C23C 18/20 | (2006.01) |

(52) U.S. Cl.
CPC ............. *H01M 10/04* (2013.01); *C08K 5/107* (2013.01); *C08K 5/151* (2013.01); *H01M 2/145* (2013.01); *H01M 2/1653* (2013.01); *H01M 2/1686* (2013.01); *B05D 1/26* (2013.01); *B05D 3/002* (2013.01); *B05D 3/02* (2013.01); *C23C 6/00* (2013.01); *C23C 18/04* (2013.01); *C23C 18/18* (2013.01); *C23C 18/20* (2013.01)

(58) Field of Classification Search
CPC .......... H01M 2/16; H01M 2/14; H01M 2/145; H01M 2/1686; H01M 2/1653; H01M 10/04; B05D 3/002; B05D 1/25; B05D 3/02; C23C 6/00; C23C 18/04; C23C 18/18; C23C 18/20
USPC ....................................................... 427/115
See application file for complete search history.

(56) References Cited

U.S. PATENT DOCUMENTS

| 5,646,201 A * | 7/1997 | Araki ................... C08F 259/08 523/201 |
|---|---|---|
| 6,409,867 B1 | 6/2002 | Kronfli et al. |
| 6,468,698 B1 | 10/2002 | Hamano et al. |
| 6,506,523 B1 | 2/2003 | Hatazawa et al. |
| 6,680,357 B1 * | 1/2004 | Hedhli ................. C08F 259/08 524/458 |
| 2002/0197536 A1 | 12/2002 | Mori et al. |
| 2006/0047095 A1 | 3/2006 | Pacetti |
| 2007/0072069 A1 | 3/2007 | Yamada et al. |
| 2009/0171004 A1 * | 7/2009 | Abusleme ............... C08L 27/16 524/520 |
| 2010/0133482 A1 * | 6/2010 | Abusleme .............. B01D 69/02 252/511 |

(Continued)

FOREIGN PATENT DOCUMENTS

| CN | 1266540 A | 9/2000 |
|---|---|---|
| CN | 101851314 A | 10/2010 |

(Continued)

OTHER PUBLICATIONS

Kim, Yong Woo et al., "Anhydrous proton conducting membranes based on crosslinked graft copolymer electrolytes", Journal of Membrane Science, 2008, 325(1), p. 319-325—Elsevier B.V.

*Primary Examiner* — Brian K Talbot

(57) ABSTRACT

The present invention pertains to a process for manufacturing a component of a secondary battery, said process comprising the following steps: (i) preparing a liquid composition comprising: —a liquid medium selected from the group consisting of aliphatic ketones, cycloaliphatic ketones, cycloaliphatic esters and mixtures thereof, and —at least one fluorinated polymer [polymer (F)] comprising recurring units derived from vinylidene fluoride (VDF), hexafluoropropylene (HFP) and at least one (meth)acrylic monomer (MA) having formula (I), wherein: —$R_1$, $R_2$ and $R_3$, equal to or different from each other, are independently selected from a hydrogen atom and a $C_1$-$C_3$ hydrocarbon group, and —$R_x$, is a hydrogen atom or a $C_1$-$C_5$ hydrocarbon moiety comprising at least one functional group selected from a hydroxyl, a carboxyl, an epoxide, an ester and an ether group; and (ii) processing said liquid composition to provide a film.

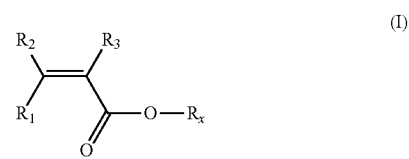

(I)

11 Claims, No Drawings

(56) References Cited

U.S. PATENT DOCUMENTS

2011/0311882 A1* 12/2011 Kim et al. .................. 429/320
2013/0264522 A1* 10/2013 Stanga .................. C08F 14/22
                                                                                     252/500

FOREIGN PATENT DOCUMENTS

| EP | 1621573 | * | 2/2006 |
|----|---------|---|--------|
| EP | 1621573 A1 | | 2/2006 |
| JP | 2000215917 A | | 8/2000 |
| JP | 2001357854 A | | 12/2001 |
| JP | 2009038020 A | | 2/2009 |
| JP | 2010061930 A | | 3/2010 |
| KR | 20030065074 A | | 8/2003 |
| WO | 9531836 A1 | | 11/1995 |
| WO | 9732347 A1 | | 9/1997 |
| WO | 2003065481 A1 | | 8/2003 |
| WO | 2008129041 A1 | | 10/2008 |
| WO | WO 2008/129041 | * | 10/2008 |

* cited by examiner

PROCESS FOR MANUFACTURING BATTERY COMPONENTS

This application is a U.S. national stage entry under 35 U.S.C. § 371 of International Application No. PCT/EP2012/061424 filed Jun. 15, 2012, which claims priority to European Application No. 11171201.4 filed Jun. 23, 2011. The entire contents of these applications are explicitly incorporated herein by this reference.

TECHNICAL FIELD

The present invention pertains to a process for manufacturing components for use in secondary batteries. More particularly, the present invention pertains to a process for manufacturing electrodes and/or separators for use in secondary batteries.

BACKGROUND ART

Vinylidene fluoride (VDF) resins are endowed with outstanding mechanical properties within a broad range of temperature and excellent resistance to high temperature, to organic solvents and to various chemically aggressive environments.

Thanks to their properties, these resins are advantageously used for manufacturing articles such as electrodes and/or separators for use in secondary batteries, especially in Lithium ion batteries.

For instance, WO 2008/129041 (SOLVAY SOLEXIS S.P.A.) 30 Oct. 2008 discloses a linear semi-crystalline vinylidene fluoride (VDF) copolymer with 0.05-10% by moles of a (meth)acrylic monomer, wherein recurring units derived from (meth)acrylic monomers are randomly distributed throughout the whole vinylidene fluoride backbone, and use thereof for manufacturing electrodes and/or separators. Solvents commonly used for dissolving these VDF copolymers typically include N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate and trimethyl phosphate.

Also, EP 1621573 A (KUREHA CORPORATION) 1 Feb. 2006 discloses porous membranes prepared by a composition comprising a vinylidene fluoride (VDF) copolymer with 0.01-10% by moles of a monomer having at least one group selected from an epoxy, a hydroxyl, a carboxyl, an ester, an amide and an acid anhydride group, a plasticizer and a suitable solvent. Representative embodiments of this document relate to hollow porous fiber membranes prepared by compositions of these copolymers in N-methyl-2-pyrrolidone.

Further, US 2002/0197536 (SAMSUNG SDI CO. LTD.) 26 Dec. 2002 discloses a polymeric electrolyte for use in Lithium batteries comprising a vinylidene fluoride (VDF) copolymer with hexafluoropropylene or a copolymer further comprising recurring units of at least one compound selected from the group consisting of acrylic acid and maleic acid monoalkylester. Representative embodiments of this document relate to electrolytic solutions of these copolymers in N-methyl-2-pyrrolidone.

Nevertheless, due to certain environmental concerns, methods wherein components of a secondary battery such as electrodes and/or separators made of VDF polymers are manufactured using alternative solvents having a more favourable toxicological profile are attracting increased attention.

There is thus still a need in the art for a process for manufacturing components of a secondary battery such as electrodes and/or separators made of VDF polymers which advantageously enables avoiding use of toxic and polluting solvents and thus eliminating cost, safety and environmental concerns related to handling of large volume of said solvents.

SUMMARY OF INVENTION

It is thus an object of the present invention a process for manufacturing a component of a secondary battery, said process comprising the following steps:
(i) preparing a liquid composition comprising:
  a liquid medium selected from the group consisting of aliphatic ketones, cycloaliphatic ketones, cycloaliphatic esters and mixtures thereof, and
  at least one fluorinated polymer [polymer (F)] comprising recurring units derived from vinylidene fluoride (VDF), hexafluoropropylene (HFP) and at least one (meth)acrylic monomer (MA) having formula (I) here below:

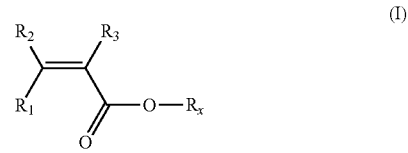

wherein:
  $R_1$, $R_2$ and $R_3$, equal to or different from each other, are independently selected from a hydrogen atom and a $C_1$-$C_3$ hydrocarbon group, and
  $R_X$ is a hydrogen atom or a $C_1$-$C_5$ hydrocarbon moiety comprising at least one functional group selected from a hydroxyl, a carboxyl, an epoxide, an ester and an ether group; and
(ii) processing said liquid composition to provide a film.

The Applicant has surprisingly found that by appropriate selection of the fluorinated polymer it is advantageously possible to obtain homogeneous liquid compositions which enable manufacturing components of a secondary battery by avoiding use of toxic and polluting organic solvents.

By "liquid composition" it is hereby intended to denote a composition which is available in liquid state at a temperature of 25° C.

The liquid composition of the process of the invention advantageously comprises at least 8% by weight, preferably at least 10% by weight, based on the total volume of the liquid composition, of at least one fluorinated polymer [polymer (F)] as defined above.

The liquid composition of the process of the invention is advantageously a solution comprising at least one polymer (F) as defined above dissolved in a liquid medium as defined above.

By the term "dissolved" it is meant that the polymer (F) is present in solubilised form in the liquid medium.

The Applicant has found that a homogeneous solution of at least one polymer (F) as defined above in a liquid medium as defined above is successfully obtained, wherein the polymer (F) is dissolved in an amount of at least 8% by weight, based on the total volume of the solution, at a temperature comprised between 20° C. and 65° C.

By "liquid medium" it is hereby intended to denote a medium which is available in liquid state at a temperature of 25° C.

The liquid medium of the liquid composition of the process of the invention advantageously dissolves at least 8% by weight, preferably at least 10% by weight, based on the total volume of the liquid composition, of at least one fluorinated polymer [polymer (F)] as defined above, at a temperature comprised between 20° C. and 65° C.

The liquid medium of the liquid composition of the process of the invention is typically selected from the group consisting of:
(a) linear or branched aliphatic ketones, preferably linear or branched aliphatic ketones having from 3 to 6 carbon atoms,
(b) cycloaliphatic ketones, optionally substituted with linear or branched aliphatic chains, said linear or branched aliphatic chains preferably comprising from 1 to 3 carbon atoms,
(c) cycloaliphatic esters, optionally substituted with linear or branched aliphatic chains, said linear or branched aliphatic chains preferably comprising from 1 to 3 carbon atoms, and
(d) mixtures thereof.

Non-limitative examples of liquid media suitable for the process of the invention include, notably, acetone, methyl ethyl ketone, cyclohexanone, γ-butyrolactone and γ-valerolactone.

Good results have been obtained with liquid media having a standard boiling point lower than 200° C. The standard boiling point is measured at standard atmospheric pressure.

The liquid medium of the liquid composition of the process of the invention is preferably selected from the group consisting of linear aliphatic ketones having a standard boiling point lower than 120° C., preferably lower than 100° C., more preferably lower than 70° C.

Very good results have been obtained when the liquid medium of the liquid composition of the process of the invention is acetone.

It is essential that the fluorinated polymer [polymer (F)] of the liquid composition of the process of the invention comprises recurring units derived from vinylidene fluoride (VDF), hexafluoropropylene (HFP) and at least one (meth)acrylic monomer (MA) having formula (I) as described above.

When a fluorinated polymer is used which comprises recurring units derived from vinylidene fluoride (VDF) and from at least one (meth)acrylic monomer (MA) having formula (I) as described, said fluorinated polymer lacking recurring units derived from hexafluoropropylene (HFP), the polymer so obtained does not dissolve in the liquid medium as defined above or partially dissolves therein in an amount of less than 8% by weight, based on the total volume of the liquid composition, at a temperature comprised between 20° C. and 65° C.

The polymer (F) of the liquid composition of the process of the invention comprises typically from 0.5% to 10% by moles, preferably from 1% to 5% by moles, more preferably from 1.5% to 3.5% by moles of recurring units derived from hexafluoropropylene (HFP).

Very good results have been obtained with a polymer (F) comprising from 1.5% to 3.5% by moles of recurring units derived from hexafluoropropylene (HFP).

The polymer (F) of the liquid composition of the process of the invention comprises typically from 0.1% to 5% by moles of recurring units derived from at least one (meth)acrylic monomer (MA) having formula (I) as described above.

The polymer (F) comprises preferably at least 0.3% by moles, more preferably at least 0.5% by moles of recurring units derived from at least one (meth)acrylic monomer (MA) having formula (I) as described above.

The polymer (F) comprises preferably at most 3% by moles, more preferably at most 1.5% by moles of recurring units derived from at least one (meth)acrylic monomer (MA) having formula (I) as described above.

The (meth)acrylic monomer (MA) of the polymer (F) preferably complies with formula (II) here below:

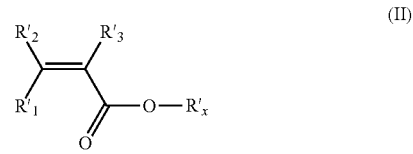

(II)

wherein:
$R'_1$, $R'_2$ and $R'_3$ are hydrogen atoms, and
$R'_X$ is a hydrogen atom or a $C_1$-$C_5$ hydrocarbon moiety comprising at least one functional group selected from a hydroxyl, a carboxyl and an ester group.

The (meth)acrylic monomer (MA) more preferably complies with formula (III) here below:

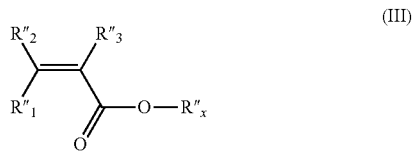

(III)

wherein:
$R''_1$, $R''_2$ and $R''_3$ are hydrogen atoms, and
$R''_X$ is a hydrogen atom or a $C_1$-$C_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The monomer (MA) is even more preferably selected from the followings:

hydroxyethyl acrylate (HEA) of formula:

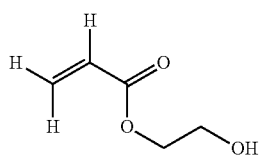

2-hydroxypropyl acrylate (HPA) of either of formulae:

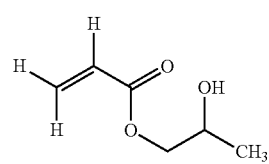

-continued

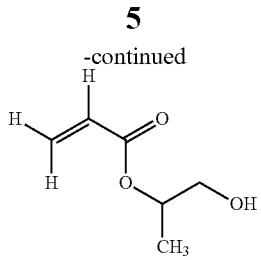

acrylic acid (AA) of formula:

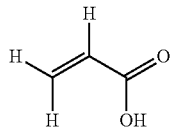

and mixtures thereof.

Very good results have been obtained when the monomer (MA) is acrylic acid (AA) or hydroxyethyl acrylate (HEA).

The polymer (F) of the liquid composition of the process of the invention may further comprise recurring units derived from at least one other comonomer [comonomer (C)].

The comonomer (C) can be either a hydrogenated comonomer [comonomer (H)] or a fluorinated comonomer [comonomer (F)].

By the term "hydrogenated comonomer [comonomer (H)]", it is hereby intended to denote an ethylenically unsaturated comonomer free of fluorine atoms.

Non-limitative examples of suitable hydrogenated comonomers (H) include, notably, ethylene, propylene, vinyl monomers such as vinyl acetate.

By the term "fluorinated comonomer [comonomer (F)]", it is hereby intended to denote an ethylenically unsaturated comonomer comprising at least one fluorine atom.

Non-limitative examples of suitable fluorinated comonomers (F) include, notably, tetrafluoroethylene (TFE), trifluoroethylene (TrFE) and vinyl fluoride.

Should the comonomer (C) be present, the polymer (F) of the liquid composition of the process of the invention comprises typically from 1% to 10% by moles, preferably from 2% to 5% by moles of recurring units derived from said comonomer (C).

The polymer (F) of the liquid composition of the process of the invention is preferably a fluorinated polymer [polymer $(F_1)$] comprising:
from 1.5% to 3.5% by moles of recurring units derived from hexafluoropropylene (HFP), and
from 0.5% to 1.5% by moles of recurring units derived from at least one (meth)acrylic monomer (MA) having formula (I) as described above, wherein the recurring units derived from vinylidene fluoride (VDF) are the complement to 100% by moles of total recurring units.

The polymer (F) of the liquid composition of the process of the invention is more preferably a fluorinated polymer [polymer $(F_2)$] comprising:
from 1.5% to 3.5% by moles of recurring units derived from hexafluoropropylene (HFP), and
from 0.5% to 1.5% by moles of recurring units derived from at least one (meth)acrylic monomer (MA) having formula (III) as described above, wherein the recurring units derived from vinylidene fluoride (VDF) are the complement to 100% by moles of total recurring units.

The polymer (F) of the liquid composition of the process of the invention is even more preferably a fluorinated polymer [polymer $(F_3)$] consisting of:
from 1.5% to 3.5% by moles of recurring units derived from hexafluoropropylene (HFP), and
from 0.5% to 1.5% by moles of recurring units derived from at least one (meth)acrylic monomer (MA) having formula (III) as described above, wherein the recurring units derived from vinylidene fluoride (VDF) are the complement to 100% by moles of total recurring units.

The polymer (F) of the liquid composition of the process of the invention can be manufactured by aqueous suspension polymerization or by aqueous emulsion polymerization processes. The polymer (F) of the liquid composition of the process of the invention is preferably manufactured by an aqueous suspension polymerization process as described in WO 2008/129041 (SOLVAY SOLEXIS S.P.A.) 30 Oct. 2008.

By "secondary battery" it is hereby intended to denote a rechargeable battery.

The secondary battery of the invention is preferably an alkaline or an alkaline-earth secondary battery.

The secondary battery of the invention is more preferably a Lithium ion battery.

In step (ii) of the process of the invention, the liquid composition is typically processed by extrusion moulding, compression moulding and/or casting to provide a film.

According to a first embodiment of the process of the invention, the liquid composition is processed by coating and drying a film onto a metal substrate to provide an electrode suitable for use in a secondary battery.

The liquid composition of this first embodiment of the process of the invention is typically an electrode-forming composition further comprising a powdery electrode material and, optionally, one or more additives, such as an electroconductivity-imparting additive and/or a viscosity modifying agent.

The electrode-forming composition of this first embodiment of the process of the invention is prepared typically by:
dissolving at least 8% by weight, preferably at least 10% by weight, based on the total volume of the binder solution, of at least one polymer (F) as defined above in a liquid medium as defined above, at temperatures advantageously comprised between 20° C. and 80° C., preferably between 21° C. and 70° C., more preferably between 22° C. and 65° C., to provide a binder solution, and
adding and dispersing a powdery electrode material as defined above and, optionally, one or more additives into said binder solution to provide said electrode-forming composition.

In the case of forming a positive electrode for a Lithium ion battery, the powdery electrode material may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a Lithium-based composite metal oxide represented by a general formula of $LiMO_2$, wherein M is defined as above. Preferred examples thereof may include: $LiCoO_2$, $LiNiO_2$, $LiNi_xCo_{1-x}O_2$ (0<x<1), and spinel-structured $LiMn_2O_4$.

As an alternative, still in the case of forming a positive electrode for a Lithium ion battery, the powdery electrode material may comprise a lithiated or partially lithiated transition metal oxyanion-based electrode materials of the nominal formula $AB(XO_4)_fE_{1-f}$, in which A is Lithium, which may be partially substituted by another alkali metal representing less that 20% of the A metals, B is a main redox transition metal at the oxidation level of +2 selected from Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1.

The above $AB(XO_4)_f E_{1-f}$ powdery electrode materials are preferably phosphate-based and may have an ordered or modified olivine structure.

More preferably, the active substance as above described complies with formula $Li_{3-x}M'_y M''_{2-y}(XO_4)_3$ in which: $0 \leq x \leq 3$, $0 \leq y \leq 2$; M' and M'' are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the powdery electrode material is a phosphate-based electrode material having the nominal formula $Li(Fe_x Mn_{1-x})PO_4$ in which $0 \leq x \leq 1$, wherein x is preferably 1 (that is to say, Lithium Iron Phosphate of formula: $LiFePO_4$).

In the case of forming a negative electrode for a Lithium ion battery, the powdery electrode material may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 µm.

An electroconductivity-imparting additive may be added in order to improve the conductivity of a resultant composite electrode layer formed by applying and drying of the electrode-forming composition of the present invention, particularly in case of using an active substance, such as LiCoO 2 or $LiFePO_4$, showing a limited electron-conductivity. Examples thereof may include: carbonaceous materials, such as carbon black, graphite fine powder and fiber, and fine powder and fiber of metals, such as nickel and aluminum.

The preferred electrode-forming composition for positive electrodes comprises:
(a) at least one polymer (F) in an amount of from 1% to 10% by weight, preferably of from 2% to 9% by weight, more preferably of about 3% by weight, based on the total weight (a)+(b)+(c);
(b) carbon black as electroconductivity-imparting additive in an amount of from 2% to 10% by weight, preferably of from 4% to 6% by weight, more preferably of about 5% by weight, based on the total weight (a)+(b)+(c);
(c) a powdery electrode material, preferably a composite metal chalcogenide represented by a general formula of $LiMY_2$, as detailed above, or a lithiated or partially lithiated transition metal oxyanion-based electrode materials of the nominal formula $AB(XO_4)_f E_{1-f}$, as detailed above, in an amount from 80% to 97% by weight, preferably from 85% to 94% by weight, more preferably about 92% by weight.

According to a second embodiment of the process of the invention, the film obtained from step (ii) is further processed to provide a separator suitable for use in a secondary battery.

For the purpose of the present invention, the term "separator" is intended to denote a discrete, generally thin, interface which moderates permeation of chemical species in contact with it. This interface may be homogeneous, that is, completely uniform in structure (dense separator), or it may be chemically or physically heterogeneous, for example containing voids, pores or holes of finite dimensions (porous separator). The terms "pore", "void" and "hole" will be used as synonyms within the context of the present invention.

Porous separators are generally characterized by a porosity (c) and an average pore diameter (d), said porosity being a measure of the fraction of the volume of the separator which is porous.

The separator obtained by this second embodiment of the invention may further comprise inorganic particles, preferably alumina and silica.

According to a first variant of this second embodiment of the process of the invention, the film obtained from step (ii) is further processed to provide a porous separator.

Should the separator be a porous separator, the process of the invention advantageously comprises further processing the film obtained from step (ii) of the process of the invention by means of at least one of irradiation, film expansion, template leaching, solution precipitation techniques.

According to the irradiation technique, the film obtained from step (ii) of the process of the invention is first irradiated with charged particles from a suitable radiation source, said particles typically breaking polymer chains and leaving sensitized/damaged tracks; then, said irradiated film is passed through a suitable etch solution etching preferentially along the sensitized tracks, thereby forming pores.

According to the film expansion technique, porous separators are prepared by subsequent orientation and stretching of the film obtained from step (ii) of the process of the invention; thus, an oriented film of the polymer (F) is typically extruded under drawdown; after cooling, the film is advantageously stretched at right angle to the original orientation, so that the crystalline structure of the polymer is typically deformed and slit-like voids are advantageously formed.

According to the template leaching technique, after a film of polymer (F) has been obtained from a liquid composition as defined above further comprising a leachable component, the leachable component is removed with a suitable solvent and a porous separator is formed. The leachable component could be a soluble low molecular weight solid or liquid, such as a plasticizer, a low molecular weight VDF polymer, and the like.

As the plasticizer, hydrogenated plasticizer may generally be used. Esters or polyesters such as citrates, phthalates, trimellitates, sabacates, adipates, azelates can be notably mentioned. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; azelaic acid-based polyesters of e.g., the azelaic acid-propylene glycol type, and azelaic acid-1,3-butylene glycol type; alkyl phthalates like, e.g. di(2-ethyl hexyl) phthalate, diisononyl phthalate, diisodecyl phthalate; alkyl and acyl citrates, e.g. triethyl citrate, acetyl triethyl citrate, tri-n-butyl citrate, acetyl-tri-n-butyl citrate, trioctyl citrate, acetyl-tri-octyl citrate trihexyl citrate, acetyl-trihexyl citrate, butyryl-trihexyl citrate or trihexyl-o-butyryl citrate; alkyl trimelliltates, like notably trimethyl trimellitate, tri-(2-ethylhexyl)trimellitate, tri-(n-octyl,n-decyl)trimellitate tri-(heptyl,nonyl)trimellitate, n-octyl trimellitate.

The film of polymer (F) obtained from step (ii) of the process of the invention is typically dipped into an extraction solvent to extract the plasticizer and the liquid medium. It is possible to carry out the extraction at room temperature obtaining a complete plasticizer extraction in a time ranging from some minutes to some hours, depending on the thickness, the nature of the extraction solvent and the agitation. Generally times of few minutes are sufficient to completely extract the plasticizer. After extraction, a porous separator is obtained.

As extraction solvents, solvents wherein the plasticizer is soluble, but which are not compatible with the polymer (F), so as not to cause the swelling thereof, are generally used. The most commonly used class of solvents is that of aliphatic alcohols, preferably having a short chain, for example from 1 to 6 carbon atoms, more preferably methanol and isopropanol.

According to the solution precipitation technique, a solution comprising the polymer (F) as defined above is precipitated into two phases, namely a solid, polymer-rich phase which forms the matrix of the separator and a liquid, polymer-poor phase that forms the separator pores. Polymer precipitation from solution can be achieved in several ways, such as cooling, solvent evaporation, precipitation by immersion in a non-solvent, imbibition of a non-solvent from the vapour phase.

According to a second variant of this second embodiment of the process of the invention, the film obtained from step (ii) is further processed to provide a dense separator.

Should the separator be a dense separator, the process of the invention advantageously comprises casting and/or melt forming the film obtained from step (ii) of the process of the invention.

Casting generally involves solution casting, wherein typically a casting knife or draw-down bar is used to spread an even film of an appropriate solution of the polymer (F) in a liquid medium as defined above across a suitable support. After the casting has been made, the liquid generally evaporates to leave a uniform dense separator.

Melt forming is commonly used to make dense separators either by extrusion as a sheet from a die or as a blown film.

According to a third variant of this second embodiment of the process of the invention, the film obtained from step (ii) is further processed to provide a composite separator.

The composite separator of this third variant of this second embodiment of the process of the invention is typically obtained by coating and drying the film obtained from step (ii) of the process of the invention onto a separator.

The composite separator of this third variant of this second embodiment of the process of the invention is preferably obtained by coating and drying the film obtained from step (ii) of the process of the invention onto a separator made of a polyolefin, said polyolefin being preferably selected from polyethylene, polypropylene and mixtures thereof.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Determination of Adhesion Properties

Adhesion properties of electrodes were measured according to ASTM D 903 at a speed of 10 mm/min at 20° C.

Determination of Ionic Conductivity

Films of polymer (F) were dipped in an electrolyte solution of $LiPF_6$ 1 M in ethylene carbonate/propylene carbonate (1:1 weight ratio) and stored at room temperature in a dry glove-box for 24 hours. The resulting polymer electrolyte was put between two stainless steel electrodes and sealed in a container.

The resistance of the polymer electrolyte was measured and the ionic conductivity ([σ]) was calculated using the following equation:

$$[\sigma] = \frac{d}{(R_b \times S)}$$

wherein d is the thickness of the film, $R_b$ is the bulk resistance and S is the area of the stainless steel electrode.

Determination of Intrinsic Viscosity

The intrinsic viscosity ([η]) of polymer (F) is measured at 25° C. by dissolving polymer (B) in N,N-dimethylformamide at a concentration of about 0.2 g/dl using a Ubbelohde viscosimeter according to the following equation:

$$[\eta] = \frac{\eta_{sp} + \Gamma \cdot \ln\eta_r}{(1+\Gamma) \cdot c}$$

wherein:
c is polymer concentration in g/dl;
$\eta_r$ is the relative viscosity, i.e. the ratio between the dropping time of sample solution and the dropping time of solvent;
$\eta_{sp}$ is the specific viscosity, i.e. $\eta_r-1$;
Γ is an experimental factor, which for polymer (F) corresponds to 3.

EXAMPLE 1 a) Preparation of VDF/HFP/HEA Copolymer

In a 4 lt. reactor equipped with an impeller running at a speed of 880 rpm were introduced in sequence 2455 g of demineralized water and 0.63 g of METHOCEL® K100 GR suspending agent.

The reactor was vented and pressurized with nitrogen to 1 bar, then 8.55 g of a 75% by volume solution of t-amyl perpivalate initiator in isododecane were introduced into the reactor, followed by 107 g of HFP monomer and 947 g of VDF monomer. The reactor was then gradually heated to 52° C. to a final pressure of 110 bar. Temperature was maintained constant at 55° C. throughout the whole trial. Pressure was maintained constant at 110 bar throughout the whole trial by feeding a 19.96 g/l aqueous solution of hydroxyethyl acrylate (HEA) monomer to a total of 709 ml. After 510 minutes the polymerization run was stopped by degassing the suspension until reaching atmospheric pressure. The polymer so obtained was then recovered, washed with demineralised water and oven-dried at 50° C. (814 g).

The polymer so obtained contained 2.3% by moles of HFP and 1.0% by moles of HEA, as determined by NMR. The polymer had a melting point of 157.7° C., as measured according to ASTM D 3418 at a heating rate of 10° C./min, and a melt flow index of 5.1 g/10 min, as measured according to ASTM D 1238 (230° C., 5 Kg).

b) Preparation of a Liquid Composition of VDF/HFP/HEA Copolymer

The polymer was dissolved in the liquid medium under magnetic stirring at 23° C. until complete dissolution occurred and a clear single phase solution was obtained. The upper limit to which the VDF/HFP/HEA copolymer was dissolved in acetone to advantageously yield a homogeneous solution was 15% weight/volume at 23° C.

Homogeneous solutions were also obtained by dissolving the VDF/HFP/HEA copolymer in a liquid medium selected from methyl ethyl ketone, cyclohexanone, γ-butyrolactone and γ-valerolactone in an amount of 10% weight/volume at 45° C.

EXAMPLE 2 a) Preparation of VDF/HFP/AA Copolymer

In a 4 lt. reactor equipped with an impeller running at a speed of 880 rpm were introduced in sequence 2460 g of demineralized water and 0.63 g of METHOCEL® K100 GR suspending agent.

The reactor was vented and pressurized with nitrogen to 1 bar, then 9.98 g of a 75% by volume solution of t-amyl perpivalate initiator in isododecane and 5.35 g of diethyl carbonate were introduced into the reactor, followed by 0.5 g of acrylic acid (AA) monomer, 107 g of HFP monomer and 949 g of VDF monomer. The reactor was then gradually heated to 55° C. to a final pressure of 110 bar. Temperature was maintained constant at 55° C. throughout the whole trial. Pressure was maintained constant at 110 bar throughout the whole trial by feeding a 17.44 g/l aqueous solution of AA monomer to a total of 750 ml. After 516 minutes the polymerization run was stopped by degassing the suspension until reaching atmospheric pressure. The polymer so obtained was then recovered, washed with demineralised water and oven-dried at 50° C. (852 g).

The polymer so obtained contained 2.5% by moles of HFP and 1.0% by moles of AA, as determined by NMR. The polymer had a melting point of 152.4° C., as measured according to ASTM D 3418 at a heating rate of 10° C./min, and a melt flow index of 2.7 g/10 min, as measured according to ASTM D 1238 (230° C., 5 Kg).

b) Preparation of a Liquid Composition of VDF/HFP/AA Copolymer

The polymer was dissolved in the liquid medium under magnetic stirring at 23° C. until complete dissolution occurred and a clear single phase solution was obtained. The upper limit to which the VDF/HFP/AA copolymer was dissolved in acetone to advantageously yield a homogeneous solution was 15% weight/volume at 23° C.

Homogeneous solutions were also obtained by dissolving the VDF/HFP/AA copolymer in a liquid medium selected from methyl ethyl ketone, cyclohexanone, γ-butyrolactone and γ-valerolactone in an amount of 10% weight/volume at 45° C.

Comparative Example 1 a) Preparation of VDF/AA Copolymer

The same procedure as detailed under Example 2 was followed, but without HFP monomer.

The polymer so obtained contained 1.0% by moles of AA, as determined by NMR. The polymer had a melting point of 162.0° C., as measured according to ASTM D 3418 at a heating rate of 10° C./min.

b) Preparation of a Liquid Composition of VDF/AA Copolymer

The polymer was partially dissolved in acetone under magnetic stirring at 23° C. Solubility of VDF/AA copolymer in acetone was 5% by weight at 23° C.

It has been thus found that homogeneous solutions of at least one polymer (F) are successfully obtained, wherein the polymer (F) according to Examples 1 and 2 of the present invention was advantageously dissolved in acetone in an amount of up to 15% weight/volume at 23° C., as compared with the VDF/AA polymer according to comparative Example 1 which was partially dissolved in acetone in an amount of up to 5% weight/volume at 23° C.

EXAMPLE 3—MANUFACTURE OF ELECTRODES

A cathode was prepared by using a 10% weight/volume solution in acetone of a VDF/HFP/AA polymer obtained following the procedure as detailed under Example 2-a) of the invention but without diethyl carbonate. The polymer so obtained contained 2.5% by moles of HFP and 1.0% by moles of AA, as determined by NMR. The polymer had a melting point of 149° C., as measured according to ASTM D 3418 at a heating rate of 10° C./min, and an intrinsic viscosity of about 3.3 dl/g.

The solution was prepared under mechanical stirring at room temperature using a Dispermat equipped with a flat PTFE disc. Conductive carbon black and Lithium Cobaltum Oxide ($LiCoO_2$) were then added thereto under moderate stirring so that a slurry was obtained at 40% of solids concentration in which the amounts of polymer (F), carbon black and $LiCoO_2$ were 5%, 5% and 90% by weight, respectively.

The slurry was thoroughly mixed to ensure a good homogeneity. All the materials involved in the slurry preparation were either dried using molecular sieve of 4 Å (for the solvents) or dried for one night at 100° C. (for the powders).

The slurry was then degassed under vacuum and spread using a Doctor Blade coating instrument on an Aluminum foil, previously degreased. The coating was finally dried in a vacuum oven at the fixed temperature for enough time to ensure solvent removal, typically: 15 min at 130° C., 30 min at 80° C., and 4 hours at 40° C. The thickness of the dried coating was about 50 μm.

Comparative Example 2—Manufacture of Electrodes

The same procedure as detailed under Example 3 of the invention was followed but using a 10% weight/volume solution in N-methyl-2-pyrrolidone of polyvinylidene fluoride (PVDF).

It has been found that good adhesion properties of electrodes prepared from solutions in acetone of a polymer (F) according to the invention were obtained as compared with those prepared from solutions of PVDF in N-methyl-2-pyrrolidone (see Table 1 here below).

TABLE 1

|  | Adhesion [N/cm] |
| --- | --- |
| Example 3 | 1.2 |
| C. Example 2 | 1.3 |

EXAMPLE 4—MANUFACTURE OF POROUS SEPARATORS

Two porous separators were prepared by using 2% weight/volume solutions in acetone of the VDF/HFP/HEA polymer obtained according to Example 1 of the invention and of the VDF/HFP/AA polymer obtained according to Example 2 of the invention.

To these solutions were added water in an amount of 7.5% by weight, then $SiO_2$ in a weight ratio of 1:10 ($SiO_2$:polymer (F)). The solutions were then cast in the form of a thin film and left at room temperature until acetone was completely evaporated. The porous films so obtained having a thickness of about 20 μm were washed with ethanol and dried at 60° C. for two hours.

It has been found that good ionic conductivity values of porous separators prepared from solutions in acetone of the polymers (F) obtained according to Examples 1 and 2 of the invention were obtained (see Table 2 here below).

TABLE 2

| | Ionic conductivity [S/cm] |
|---|---|
| Example 4 | Polymer (F) of Example 1: $1.3 \times 10^{-3}$ |
| | Polymer (F) of Example 2: $1.1 \times 10^{-3}$ |

In view of the above, films obtained by processing a liquid composition according to the process of the invention were found to be suitable for the manufacture of electrodes and/or separators for use in secondary batteries.

The invention claimed is:

1. A process for manufacturing a component of a secondary battery, said process comprising:
   (i) preparing a liquid composition, wherein the liquid composition comprises:
      a liquid medium selected from the group consisting of aliphatic ketones, cycloaliphatic ketones, cycloaliphatic esters and mixtures thereof, and
      at least one fluorinated polymer (F), wherein polymer consists of:
         (a) from 1.5% to 3.5% by moles of recurring units derived from hexafluoropropylene (HFP),
         (b) from 0.5% to 1.5% by moles of recurring units derived from at least one (meth)acrylic monomer (MA) of formula (III):

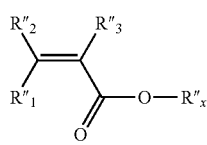

wherein:
      $R''_1$, $R''_2$ and $R''_3$ are hydrogen atoms, and
      $R''_x$ is a hydrogen atom or a $C_1$-$C_5$ hydrocarbon moiety comprising at least one hydroxyl group, and
   (c) recurring units derived from vinylidene fluoride (VDF) in an amount that is complement to 100% by moles of total recurring units,
   wherein at least 8% by weight of polymer (F), based on the total volume of the liquid composition, dissolves in the liquid medium at temperatures comprised between 20° C. and 80° C.; and
(ii) processing said liquid composition to provide a film.

2. The process according to claim 1, wherein at least 10% by weight of polymer (F), based on the total volume of the liquid composition, dissolves in the liquid medium at temperatures comprised between 20° C. and 80° C.

3. The process according to claim 1, wherein the liquid composition is an electrode-forming composition further comprising a powdery electrode material and, optionally, one or more additives which is processed by coating and drying a film onto a metal substrate to provide an electrode.

4. The process according to claim 1, wherein the film obtained from step (ii) is further processed by means of at least one of irradiation, film expansion, template leaching, solution precipitation techniques to provide a porous separator.

5. The process according to claim 1, wherein the film obtained from step (ii) is further processed by casting and/or melt forming to provide a dense separator.

6. The process according to claim 1, wherein the film obtained from step (ii) is further processed by coating and drying onto a separator to provide a composite separator.

7. The process according to claim 6, wherein the composite separator is obtained by coating and drying the film obtained from step (ii) onto a separator made of a polyolefin.

8. The process according to claim 7, wherein the polyolefin is selected from polyethylene, polypropylene and mixtures thereof.

9. The process according to claim 1, wherein the liquid medium is selected from acetone, methyl ethyl ketone, cyclohexanone, γ-butyrolactone, γ-valerolactone and mixtures thereof.

10. The process according to claim 1, wherein the (meth)acrylic monomer (MA) is selected from:

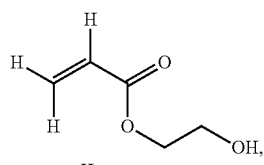
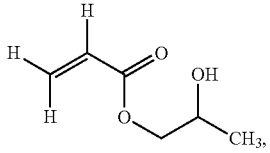
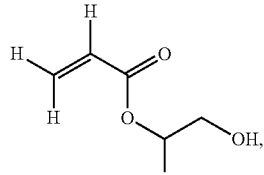
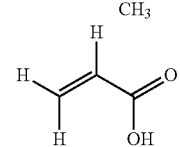

and mixtures thereof.

11. The process according to claim 1, wherein the (meth)acrylic monomer (MA) is acrylic acid or hydroxyethyl acrylate.

* * * * *